(12) United States Patent
Shibayama

(10) Patent No.: US 8,310,517 B2
(45) Date of Patent: Nov. 13, 2012

(54) OPTICAL SCANNING DEVICE AND IMAGE FORMING APPARATUS

(75) Inventor: Yasuyuki Shibayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 12/794,441

(22) Filed: Jun. 4, 2010

(65) Prior Publication Data
US 2010/0315477 A1    Dec. 16, 2010

(30) Foreign Application Priority Data

Jun. 15, 2009 (JP) .................. 2009-142042
Sep. 1, 2009 (JP) .................. 2009-201355

(51) Int. Cl.
B41J 2/385 (2006.01)
B41J 15/14 (2006.01)
B41J 27/00 (2006.01)

(52) U.S. Cl. ........ 347/261; 347/134; 347/241; 347/243; 347/256; 347/260

(58) Field of Classification Search .................. None
See application file for complete search history.

(56) References Cited

U.S. PATENT DOCUMENTS 5,870,132 A * 2/1999 Inoue et al. .................. 347/243
6,621,511 B2   9/2003 Shibayama et al.
2008/0165244 A1 * 7/2008 Tomioka et al. ............. 347/261

FOREIGN PATENT DOCUMENTS

| JP | 2001-33719  | A  | 2/2001 |
| JP | 2001-281584 | A  | 10/2001 |
| JP | 2004-20692  | A  | 1/2004 |
| JP | 3536962     | B2 | 3/2004 |
| JP | 2004-354500 | A  | 12/2004 |
| JP | 2007-133334 | A  | 5/2007 |
| JP | 2008-170485 | A  | 7/2008 |

* cited by examiner

*Primary Examiner* — Matthew Luu
*Assistant Examiner* — Kendrick Liu
(74) *Attorney, Agent, or Firm* — Dickstein Shapiro LLP

(57) ABSTRACT

An optical scanning device includes a first optical a light source that has a plurality of luminous points; a first optical system that shapes a plurality of beams of light; a rotary polygon mirror an optical scanning system that causes the beams of light deflected to form images on a surface to be scanned, wherein $\beta$ is assumed to be half of an angle formed between the optical axis of the first optical system and the optical axis of the optical scanning system within the deflecting/scanning surface, $\delta$ is assumed to be a distance between an intersection dc and an intersection hh, wherein $\delta$ is set to be zero or a negative value, given that $\delta$ is defined positive when the intersection dc is present on the optical-scanning side of the intersection hh.

8 Claims, 11 Drawing Sheets

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2009-142042 filed in Japan on Jun. 15, 2009 and Japanese Patent Application No. 2009-201355 filed in Japan on Sep. 1, 2009.

BACKGROUND OF THE INVENTION

1. Field of the Invention

The present invention relates to an optical scanning device and an image forming apparatus, such as a copier, a facsimile machine, a printer, or a multifunction product, that includes the optical scanning device.

2. Description of the Related Art

In accordance with the need for higher speed and higher resolution in the field of image forming apparatuses, such as copiers, facsimile machines, printers, and multifunction productions (MFPs), the number of scanning beams used in optical scanning systems has increased more and more, and optical scanning devices that emit a plurality of beams have become widely used.

In a conventional optical scanning device that scans a target surface with two laser beams (see, for example, Japanese Patent Application Laid-open No. 2007-133334), the amount of jitter in the sub-scanning direction at one edge of the scanning area of the target surface is adjusted to be substantially equal to the amount of jitter at the other edge by setting each laser beam in such a manner that, when the laser beam strikes the center of the scanning area, the chief ray of the laser beam intersects with a point, on a reflecting surface, that is shifted a predetermined distance shifted away from the center of the reflecting surface in the main-scanning direction, with the shift being in a direction away from the light source unit.

Another optical scanning device (see, for example, Japanese Patent Application Laid-open No. 2001-281584) includes a first optical system that converts the state of a beam of light emitted from a light source unit; a second optical system that causes the beam of light to form an image in the shape of a line running in the main-scanning direction; a deflecting unit that has a deflecting surface and reflects, using the deflecting surface, the projected beam of light thereto in the main-scanning direction; and a third optical system that causes the beam of light to form an image on a surface to be scanned. A first state is assumed to be the state where the beam of light goes, after being reflected by the deflecting unit, toward a first end of the surface to be scanned, in which the first end is farther from the light source unit than the optical axis of the third optical system. A second state is assumed to be the state where the beam of light goes toward a second end of the surface to be scanned, in which the second end is closer to the light source unit than the optical axis of the third optical system. A cross-point is assumed to be the intersection of the deflecting surface in the first state and the deflecting surface in the second state. The deflecting unit or the light source unit is arranged so that, after the beam of light passes through the second optical system, the chief ray of the beam does not pass through the cross-point, which suppresses unevenness of the pitch of the scanning lines caused by any optical face tangle error.

Another optical scanning device (see, for example, Japanese Patent Application Laid-open No. 2004-020692) includes a light source unit that emits a plurality of beams of light; a rotary polygon mirror that deflects the two or more beams of light; and an optical scanning system that guides the tow or more beams of light onto a surface to be scanned so that the surface is scanned in the main-scanning direction with the individual beams of light, which are separated in the sub-scanning direction. The surface to be scanned has a rotating axis that is nearly in the same direction as the main scanning direction, but arranged being inclined. One beam of light on the obtuse-angle side out of a plurality of beams is assumed to a beam A, and another beam of light on the acute-angle side is assumed to a beam B, and both the angle of incidence $\theta a$ of the beam A with the rotary polygon mirror and the angle of incidence $\theta b$ of the beam B with the rotary polygon mirror are adjusted appropriately so as to suppress jitter caused by the beams of light that strike the surface. The optical scanning device can thus scan the target surface with the beams of light with a high accuracy so as to allow high-speed and high-quality image formation.

Another optical scanning device (see, for example, Japanese Patent Application Laid-open No. 2004-354500) includes a deflecting unit made of a rotary polygon mirror, deflects a beam of light emitted from a light source unit, and also includes an optical scanning system that guides the beam of light deflected by the deflecting unit onto a surface to be scanned. In the optical scanning device, certain parameters satisfy a predetermined relation so as to reduce unevenness of the pitch caused by any optical face tangle error and allow highly fine images to be formed. These parameters include a diameter of the circumscribed circle of the rotary polygon mirror, a number of deflecting surfaces of the rotary polygon mirror, an angle of incidence of the beam of light with the deflecting surface when the center of an effective scanning area is scanned, a maximum swing angle of the deflecting surface while scanning the effective scanning area, and a magnification in a sub-scanning cross section of the optical scanning system.

However, with the above-described conventional optical scanning devices, when a target surface is scanned with a plurality of beams, misalignment (image misalignment) occurs between the beams at the scanning-start-side edge of the target surface and those at the scanning-end-side edge and it is not possible to prevent this misalignment, which causes degradation to the formed image.

The misalignment and the degradation of the formed image due to the misalignment are described in detail below with reference to FIGS. 10 and 11.

FIG. 10 is a schematic diagram of the configuration of a conventional optical scanning device (scanning optical device) that uses a plurality of beams. The optical scanning device includes a light source 200 having three luminous points 201, 202, and 203.

The reference numerals B1, B3, and B5 shown in FIG. 10 denote the chief rays of the beams emitted from the luminous points 201, 202, and 203, respectively.

The reference numerals 204 and 205 denote beam shaping lenses. The reference numeral 205 denotes a cylinder lens having a power only in a direction perpendicular to the deflecting/scanning direction (hereinafter, "sub-scanning direction") and causes each beam of light to form an image in the shape of a line running in the deflecting/scanning direction.

The reference numeral 206 denotes a rotary polygon mirror; the reference numeral 207 denotes a scanning lens; and the reference numeral 208 denotes a surface to be scanned.

In this conventional optical scanning device that uses a plurality of beams, each beam strikes a deflecting surface 206a of the rotary polygon mirror 206 within a deflecting/scanning surface at a different angle.

As described above, the deflecting surface 206a of the rotary polygon mirror 206 receives each beam at a different rotation angle when a predetermined position on the surface 208 is scanned (or when each beam enters the scanning lens at a predetermined viewing angle); therefore, if various parameters are not adjusted appropriately, the image forming positions within the scanning area become asymmetric in the sub-scanning direction (i.e. $\epsilon \neq \epsilon'$), as shown in FIG. 11, i.e., a misalignment (also called "asymmetric misalignment") occurs. A large degree of unbalance of such a misalignment may cause degradation of the formed image.

SUMMARY OF THE INVENTION

It is an object of the present invention to at least partially solve the problems in the conventional technology.

According to an aspect of the present invention, there is provided an optical scanning device including: a light source that has a plurality of luminous points; a first optical system that shapes a plurality of beams of light emitted from the light source; a rotary polygon mirror that has deflecting surface and that deflects the beams of light output from the first optical system by the deflecting surface; and an optical scanning system that causes the beams of light that are deflected by the rotary polygon mirror to form images on a surface to be scanned, wherein after chief rays of the beams of light are output from the first optical system, the chief rays strike the deflecting surface with different angles with respect to the optical axis of the optical scanning system within a deflecting/scanning surface of the rotary polygon mirror, β is assumed to be half of an angle formed between the optical axis of the first optical system and the optical axis of the optical scanning system within the deflecting/scanning surface, δ is assumed to be a distance between an intersection dc and an intersection hh, the distance being when an angle of β is formed between the optical axis of the first optical system and a normal perpendicular to the deflecting surface, and the normal passing through the rotation axis of the rotary polygon mirror, where the intersection dc is the intersection of the optical axis of the first optical system and the deflecting surface, and the intersection hh is the intersection of the deflecting surface and the normal passing through the rotation axis of the rotary polygon miller, and δ is set to be zero or a negative value, given that δ is defined positive when the intersection dc is present on the optical-scanning side of the intersection hh.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
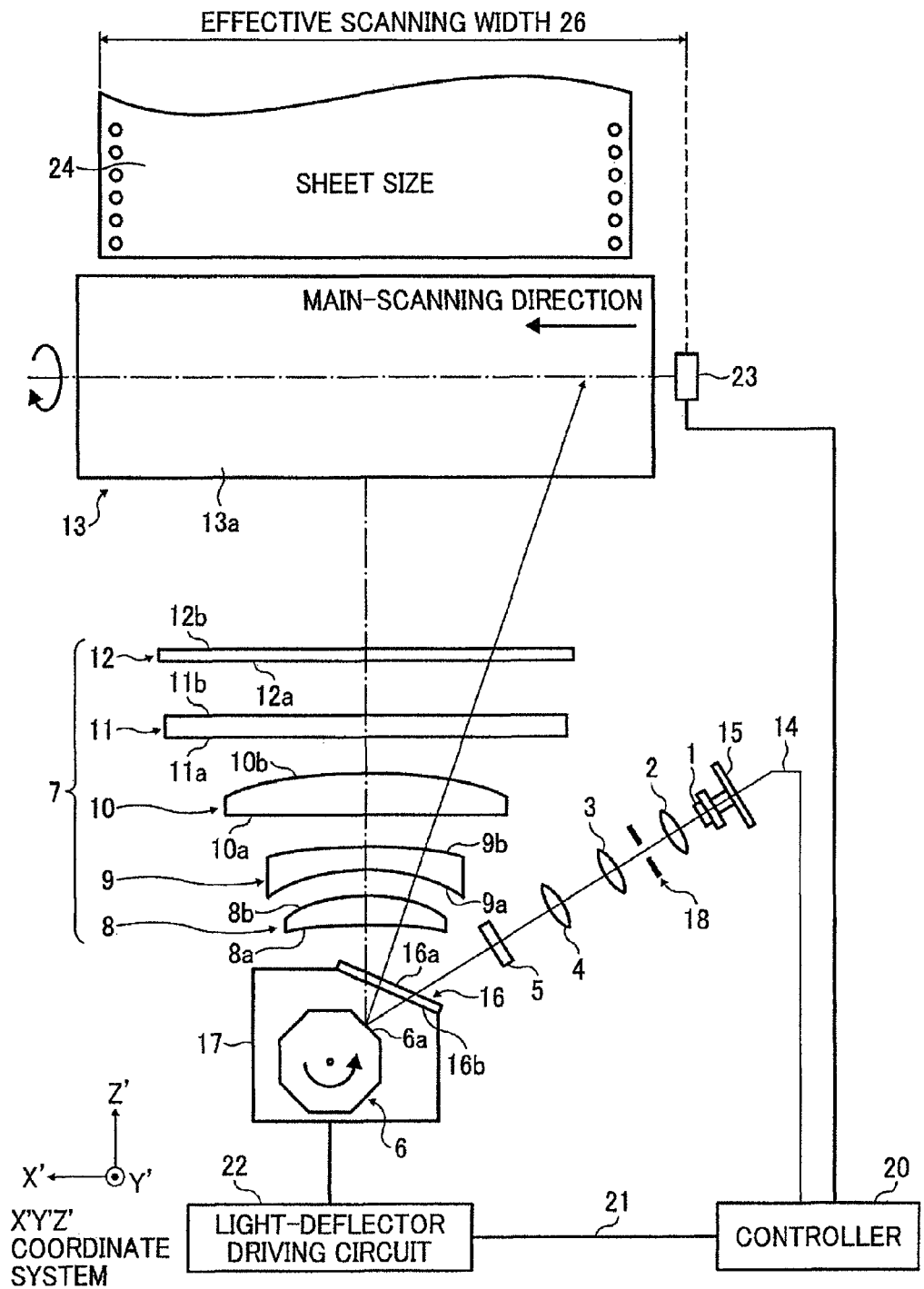
FIG. 1 is a schematic diagram of the configuration of an optical scanning device according to a first embodiment of the present invention.

FIG. 1 is a schematic diagram of a configuration of an optical scanning device according to a first embodiment of the present invention.

Figure 2:
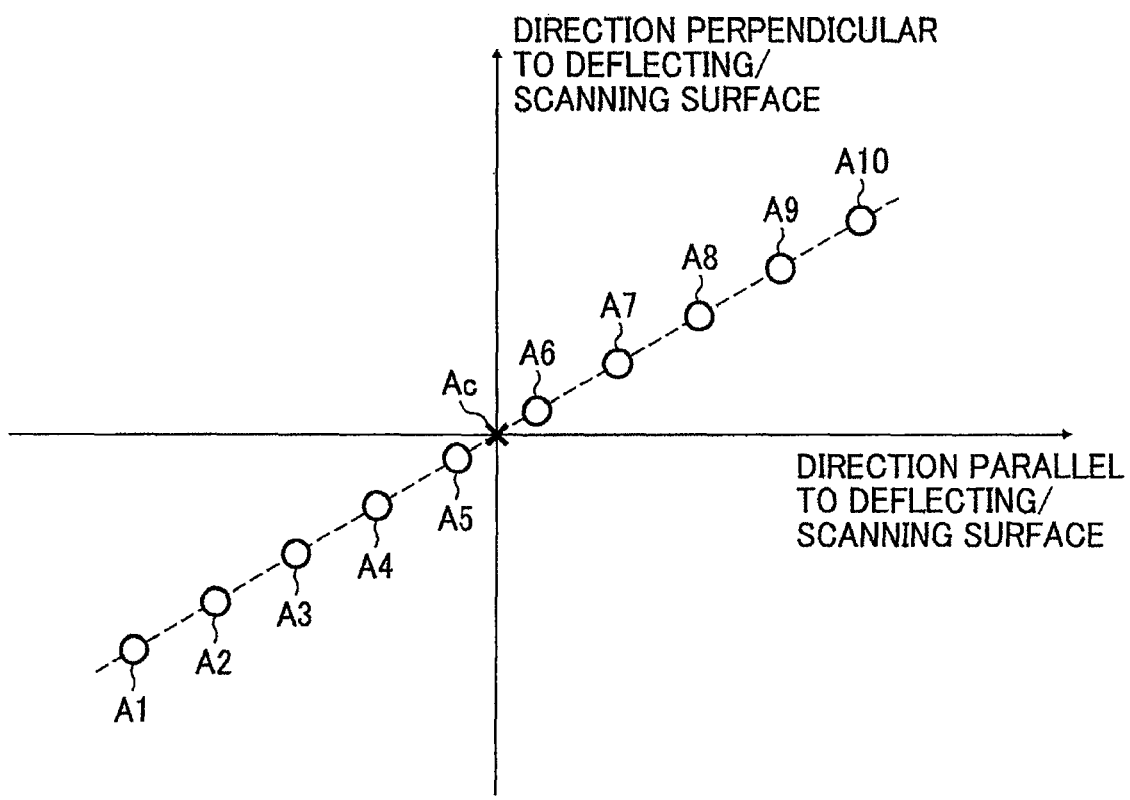
FIG. 2 is a schematic diagram that illustrates the arrangement of luminous points of a multi-beam light source shown in FIG. 1.

FIG. 2 is a schematic diagram that illustrates the arrangement of luminous points of a multi-beam light source shown in FIG. 1.

The optical scanning device is included in an image forming apparatus, such as a copier, a facsimile machine, a printer, or an MFP. The optical scanning device includes, as shown in FIG. 1, a multi-beam light source (hereinafter, "light source" in short) 1 that is used for optical recording using a plurality of beams of light (multi-beams).

The light source 1, as shown in FIG. 2, has ten luminous points A1 to A10. The individual luminous points A1 to A10 are aligned at equal intervals in a one-dimensional manner.

The luminous points A1 to A10 are aligned in a row so that the row makes a certain angle with a direction perpendicular to a deflecting/scanning surface of a rotary polygon mirror (the vertical axis direction of FIG. 2), which will be later described.

A laser driver 15 causes the individual luminous points A1 to A10 to emit light in accordance with an image data signal 14 received from a controller 20 shown in FIG. 1.

The light source 1 is, for example, a laser diode array, such as an end-surface emitting laser diode array or a surface-emitting laser diode array.

If such a laser diode array is used, because the light source is manufactured by using technologies for semiconductor processing, the luminous points of the light source will be aligned with a high accuracy.

As shown in FIG. 1, the laser driver 15 enables the light source 1 to emit a plurality of individually modulated beams of light from the luminous points in accordance with the image data signal 14 received from the controller 20. The plurality of beams emitted from the light source 1 are converted into beams of substantially parallel light by the effect of a coupling lens 2.

After that, the beams of substantially parallel light pass through an aperture 18 and then pass through a beam expander that is made up of a lens 3 and a lens 4. The beam expander changes the diameter of the beams.

After that, the beams of light pass through a cylinder lens 5 and then form images in shape of a plurality of lines running in the deflecting/scanning direction. The beams of light are then reflected by a deflecting surface (reflecting surface) 6a of a rotary polygon mirror (also called "light deflector") 6.

The rotary polygon mirror 6 is accommodated in a rotary-polygon-mirror housing (also called "light-deflector housing") 17 with a rotary-polygon-mirror opening (also called "light-deflector opening") 16. The rotary polygon mirror 6 is rotated by a light-deflector driving circuit (also called "rotary-polygon-mirror driving circuit") 22 in accordance with a rotation control signal 21 received from the controller 20.

The coupling lens 2, the lenses 3 and 4, and the cylinder lens 5 correspond to a first optical system.

FIGS. 3A to 3D are detailed schematic diagrams that illustrate transmissions of the beams of light from the light source 1 to the rotary polygon mirror 6.

Figure 3A:
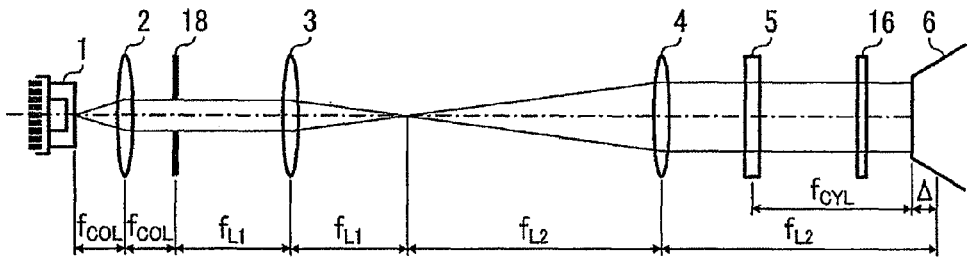
FIGS. 3A to 3D are detailed schematic diagrams of an optical system between the multi-beam light source and a light deflector shown in FIG. 1.
Figure 3B:
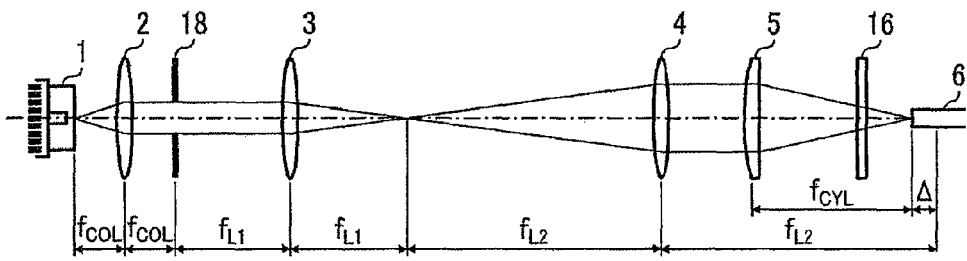
Figure 3C:
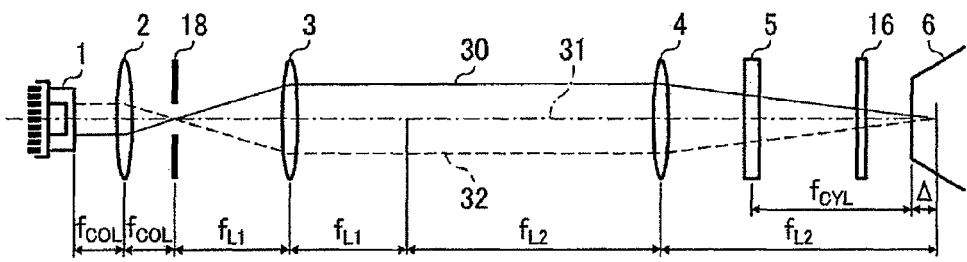
Figure 3D:
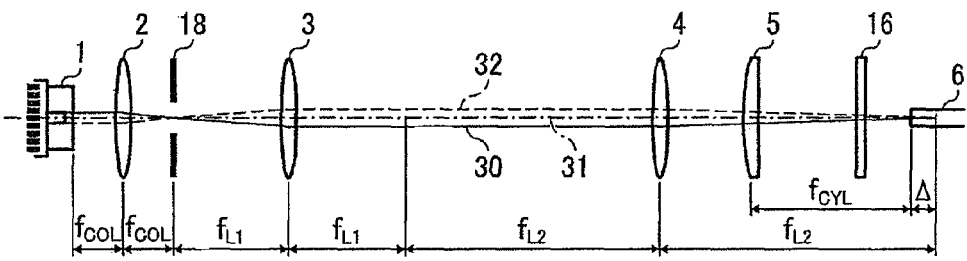

FIG. 3A is a schematic diagram that illustrates the behavior of the beam of light in the main-scanning direction (deflecting/scanning direction); FIG. 3B is a schematic diagram that illustrates the behavior of the beam of light in the sub-scanning direction (direction perpendicular to the deflecting/scanning direction); FIG. 3C is a schematic diagram that illustrates behaviors of the chief rays of the beams of light in the main-scanning direction; and FIG. 3D is a schematic diagram that illustrates behaviors of the chief rays of the beams of light in the sub-scanning direction.

To make the description simpler, only one beam of light is shown in FIGS. 3A and 3B that is emitted from an virtual luminous point Ac that is at the center of the luminous points A1 to A10 (the center point of the luminous points A5 and A6) because the light source 1, in the present embodiment, has the even number of luminous points. To make the description simpler, only three beams of light are shown in FIGS. 3C and 3D that are emitted from the end luminous points A1 and A10 and the virtual luminous point Ac.

Although, in the present embodiment, the light source has ten luminous points, the number of the luminous points can be any value larger than one.

If the number of the luminous points is odd, the chief ray emitted from the middle luminous point, which is located at the center of the row of the luminous points, is coincident with the optical axis of the pre-rotary-polygon-mirror lens system that includes the lenses from the coupling lens 2 to the cylinder lens 5. The optical axis, herein, is an axis that passes through the origins of the input surface and the output surface of each lens, given that the shapes of the input surface and the output surface of each lens that is arranged upstream of the rotary polygon mirror are represented by equations.

If the number of the luminous points is even as in the present embodiment, the virtual luminous point is set at the center of the row of the luminous points.

If, in the first optical system, the focal length of the coupling lens 2 is $f_{COL}$, the focal length of the lens 3 is $f_{L1}$, the focal length of the lens 4 is $f_{L2}$, and the focal length of the cylinder lens 5 is $f_{CYL}$, then these lenses are arranged between the light source 1 and the rotary polygon mirror 6 as shown in FIGS. 3A to 3D.

The symbol $\Delta$ shown in FIGS. 3A to 3D is the distance between the point of intersection of the chief ray incoming to the rotary polygon mirror 6 and the deflecting surface 6a. The value of $\Delta$ can be appropriately set.

If $\Delta=0$, because the point of intersection is substantially coincident with the deflecting surface 6a of the rotary polygon mirror 6, even if a multi-beam light source is used, the size of the deflecting surface 6a becomes substantially the same as the size of a deflecting surface for a single-beam light source so as to avoid unnecessarily increasing the size of the rotary polygon mirror 6.

The beam expander, which is made up of the lenses 3 and 4, causes the beam of light output from the coupling lens 2 to diverge. And the beam expander changes the angle of intersection of the chief ray of light input to the rotary polygon mirror 6 smaller than the angle of intersection of the beam of light output from the coupling lens 2, as shown in FIG. 3C.

As shown in FIG. 1, after being deflected by the rotary polygon mirror 6, the two or more beams of scanning light form, via a group of scanning lenses (also called "optical scanning elements") 7, images on a surface (e.g., the surface of a photosensitive element of the image forming apparatus) 13a of a target to be scanned (e.g., the photosensitive elements in the image forming apparatus) 13 in both the main-scanning direction and the sub-scanning direction. Thus, the surface 13a is scanned with the beams of light.

Multi-beam optical recording is implemented by using modulated imaging spots (not shown) formed on the surface 13a.

The optical scanning device shown in FIG. 1 includes a photodetector 23 near one edge of the surface 13a called "scanning start edge (printing start edge)". During an optical recording process of scanning an area from the photodetector 23 to the other edge of the surface 13a called "scanning end edge (printing end edge)" that covers the maximum sheet size 24, it is necessary to maintain the quality of the imaging spots high enough. The area is called "effective scanning width 26".

The deflecting surface 6a of the rotary polygon mirror 6 and the surface to be scanned 13a are in an optically conjugate relation and they are together used to correct optical face tangle errors.

In the present embodiment, the group of scanning lenses 7 corresponds to an optical scanning system. The group of scanning lenses 7 is made up of five lenses that include glass lenses 8 to 11 and a transparent resin lens 12. The transparent resin lens 12 is between the glass lens 11 and the surface 13a.

See Table 1 for a specification sheet for the lenses of the optical system.

Each of the coupling lens 2, the lens 3, the lens 4, and the cylinder lens 5 is made of glass.

See Table 2 for a specification sheet for the scanning lenses 7 between the deflecting surface 6a of the rotary polygon mirror 6 and the surface 13a.

The surface number (1) shown in Table 2 represents the deflecting surface 6a of the rotary polygon mirror 6; the surface numbers (2) and (3) represent an input surface 16a and an output surface 16b of the light-deflector opening 16, respectively (it is noted that the input surface 16a is the output surface of the beam of light reflected from the deflecting surface 6a, and the output surface 16b is the input surface of the beam of light reflected from the deflecting surface 6a).

The surface numbers (4) to (13) represent the surfaces of the lenses that make up the scanning lenses 7. The surface numbers (4) and (5) represent an input surface 8a and an output surface 8b of the two-sided spherical lens 8, respectively. The surface numbers (6) and (7) represent an input surface 9a and an output surface 9b of the two-sided spherical lens 9, respectively. The surface numbers (8) and (9) represent an input surface 10a and an output surface 10b of the toric lens 10, respectively. The input surface 10a with the surface number (8) is flat, and the output surface 10b with the surface number (9) is a toric surface.

The surface numbers (10) and (11) represent an input surface 11a and an output surface 11b of the cylinder lens 11, respectively. The input surface 11a with the surface number (10) is a sub-scanning directional cylinder surface, and the output surface 11b with the surface number (11) is flat.

The surface numbers (12) and (13) represent an input surface 12a and an output surface 12b of the two-sided aspherical lens 12, having a negative refractive power in the sub-scanning direction.

The surface number (14) represents the surface 13a that is to be scanned.

The two-sided spherical lenses 8 and 9, the toric lens 10, and the cylinder lens 11 are made of glass, for example, S-PHM52, S-TIH6, S-BSM18, or S-BSL7 (registered trademarks) produced by OHARA INC (registered trademark) or the like. The two-sided aspherical lens 12 is made of resin, for example, ZEONEX E48R (registered trademark) produced by or the like.

The input surface 12a and the output surface 12b of the two-sided aspherical lens 12 are aspheric shapes represented by Equations 5 and 6, respectively, in which the main-scanning direction is x, the sub-scanning direction is y, and the optical-axis direction is z:

$$z(x, y) = \frac{\frac{2y^2}{\alpha r_y} - \frac{y^4}{\alpha^2 r_x r_y^2} + \frac{x^2}{r_x}}{1 + \sqrt{\left(1 - \frac{y^2}{\alpha r_x r_y}\right)^2 - \left(\frac{x}{r_x}\right)^2}} + \sum_{m,n} P_{mn} x^m y^n \quad (5)$$

$$\alpha = 1 + \sqrt{1 - (1 + k_y)\left(\frac{y}{r_y}\right)^2} \quad (6)$$

In Equations 5 and 6, $r_x$ is the radius of curvature of the generatrix (in the main-scanning direction), $r_y$ is the radius of curvature of the directrix (in the sub-scanning direction), and $k_y$ is the conic constant ($k_y$=0).

The first term in the right side of Equation 5 represents a basic toric shape, and the second term in the right side represents an additional function for adding an optical-axis asymmetric component to the basic shape.

$P_{mn}$ in Equation 5 is the constant and determined by the specification sheet shown in Table 3. Due to the $P_{mn}$, the generatrixes of both the input surface 12a and the output surface 12b of the two-sided aspherical lens 12 are defined curved lines that are not arched but symmetric with respect to the optical axis, and the directrixes on an arbitrary y-z cross section are defined curved lines that are neither arched nor symmetric with respect to the optical axis.

The incoming/reflected rays of light to/from the deflecting surface 6a of the rotary polygon mirror 6 are described in detail below.

Figure 4:
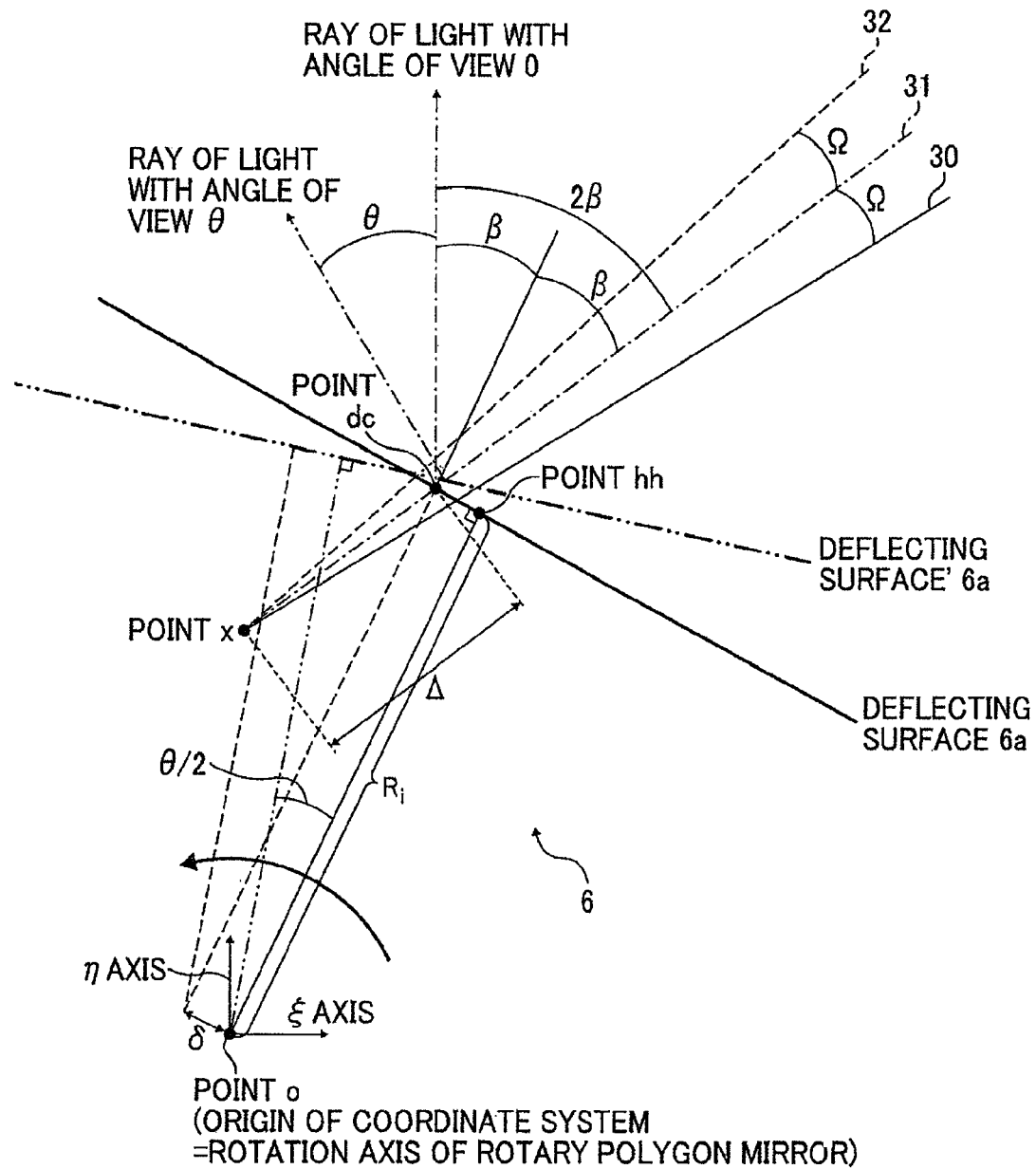
FIG. 4 is a schematic diagram that illustrates the chief rays' incoming to and reflected from a deflecting surface of a rotary polygon mirror shown in FIG. 1.

FIG. 4 is a schematic diagram that illustrates the chief rays' incoming to and reflected from the deflecting surface 6a of the rotary polygon mirror 6.

$R_i$ shown in FIG. 4 is the radius of the inscribed circle of the rotary polygon mirror 6.

2β is the angle formed between the optical axis of the pre-rotary-polygon-mirror lens system and the optical axis of the optical scanning system.

Ω is the maximum value of an angle formed between the optical axis of the pre-rotary-polygon-mirror lens system and the chief ray of any of the beams of light output from the pre-rotary-polygon-mirror lens system (in the present embodiment, the angle formed between the chief ray 31 of the two or more beam of light emitted from the virtual luminous point Ac and the chief ray of the beam of light emitted from either the end luminous point A1 or A10).

δ is the distance between a point dc and a point hh, the distance being when the angle of β is formed between the optical axis of the pre-rotary-polygon-mirror lens system and the normal perpendicular to the deflecting surface 6a of the rotary polygon mirror 6, and the normal passing through the rotation axis of the rotary polygon mirror 6, where the point dc is the intersection of the optical axis of the pre-rotary-polygon-mirror lens system and the deflecting surface 6a, and the point hh is the intersection of the deflecting surface 6a and the normal passing through the rotation axis of the rotary polygon mirror 6.

Δ is the distance between the point dc and a point x, the distance being when the angle of β is formed between the optical axis of the pre-rotary-polygon-mirror lens system and the normal perpendicular to the deflecting surface 6a of the rotary polygon mirror 6, and the normal passing through the rotation axis of the rotary polygon mirror 6, where the point dc is the intersection of the optical axis of the pre-rotary-polygon-mirror lens system and the deflecting surface 6a, and the point x is the intersection of the chief rays of the beams of light emitted from the pre-rotary-polygon-mirror system, in the present embodiment, that is the intersection of the chief rays 30, 31, and 32.

δ is positive when the point dc is on the scanning-lenses-7 side of the point hh, and Δ is positive when the point x is inside of the deflecting surface 6a of the rotary polygon mirror 6 (i.e., in the example shown in FIG. 4, both δ and Δ are positive).

The Ω and β are positive when they are on the counter-clockwise side of the optical axis of the pre-rotary-polygon-mirror lens system (in the present embodiment, the optical axis of the pre-rotary-polygon-mirror lens system is coincident with the chief ray 31).

The rotation angle of the rotary polygon mirror 6 is measured from a reference position, and the reference position is a position of the rotary polygon mirror 6 when the angle of β is formed between the optical axis of the pre-rotary-polygon-mirror lens system and the normal perpendicular to the deflecting surface 6a, the normal passing through the rotation axis of the rotary polygon mirror 6. The rotation angle is positive when it is on the counterclockwise side. When the rotary polygon mirror 6 is at the reference position, the angle of view of the incoming light with the scanning lenses 7 is zero degree.

In the example shown in FIG. 4, when the rotary polygon mirror 6 rotates θ/2 and the deflecting surface 6a moves to the position indicated by the deflecting surface' 6a, the angle of view becomes θ.

It is noted that the optical axis of the scanning lenses 7 is an axis that passes through, when the shapes of the input surface and the output surface of each lens forming the scanning lenses 7 are represented by equations, the origins of the input surface and the output surface of each lens.

In the present embodiment, if the X'Y'Z' coordinate system shown in FIG. 1 is taken, in order to optimize the optical characteristics on the imaging surface, the scanning lenses 7 are arranged in such a manner that the optical axis of the scanning lenses 7 is at a position shifted in the negative X' direction.

The amount of this shift is called "amount of shift away from the scanning-lens center ($\delta$)" and $\delta$ is set to −0.904 mm in the present embodiment.

The value of $\delta$ is equal to the distance between the incoming ray (the chief ray of) of light to the scanning lenses 7 at the angle of view 0 degree and the optical axis of the scanning lenses 7.

In the optical scanning device with the above configuration, in order to reflect the chief rays 30 and 32 from the rotary polygon mirror 6 toward the direction of the angle of view $\theta$, it is necessary to further rotate the rotary polygon mirror 6 either $+\Omega/2$ or $-\Omega/2$ from the position of the rotation angle $\theta/2$. Therefore, the reflection points of the chief rays on the deflecting surface 6a are different from each other.

The incoming beam of light to the rotary polygon mirror 6 is convergent light in the sub-scanning direction; therefore, these differences may cause misalignment (image misalignment) on the surface 13a in the sub-scanning direction.

Figure 5:
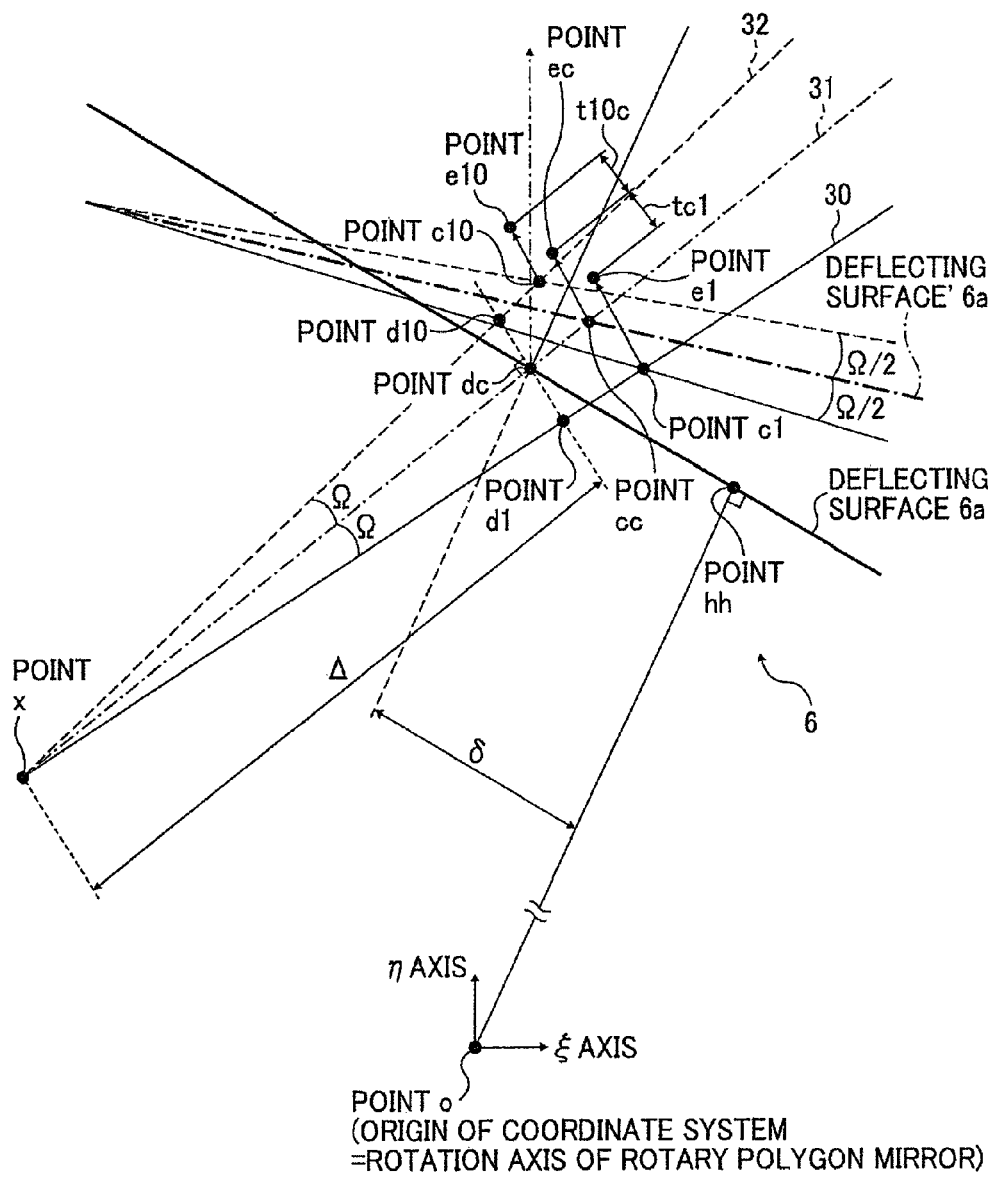
FIG. 5 is a detailed schematic diagram that illustrates the chief rays' incoming to and reflected from the deflecting surface of the rotary polygon mirror shown in FIG. 1.

FIG. 5 is a detailed schematic diagram that illustrates the chief rays' incoming to and reflected from the deflecting surface 6a of the rotary polygon mirror 6.

When the rotation angle of the rotary polygon mirror 6 becomes $\theta/2$ and the deflecting surface 6a moves to the position indicated by the deflecting surface' 6a, the angle of view of the chief ray 31 of the reflected light becomes $\theta$.

When the intersection of the chief ray 31 and the deflecting surface 6a in the above situation is assumed to be a point cc, then the convergent point of the beam of light with the chief ray 31 in the sub-scanning direction becomes a point ec that is shifted with a distance between the point cc and the point dc.

On the other hand, when the rotation angle of the rotary polygon mirror 6 becomes $\theta/2-\Omega/2$ and the deflecting surface 6a rotates $-\Omega$ from the position indicated by the deflecting surface' 6a, the angle of view of the chief ray 31 becomes $\theta$.

When the intersection of the chief ray 30 and the deflecting surface 6a in the above situation is assumed to be a point c1, then the convergent point of the beam of light with the chief ray 30 in the sub-scanning direction becomes a point e1 which is shifted a certain distance away from the point c1 in a beam reflected direction, where the certain distance is the distance between the point c1 and the point d1.

Points c10, d10, and e10 are determined depending on the chief ray 32 in the same manner.

If the chief ray 31 is thought to be the referential ray, the amounts of shifts of the convergent points in the sub-scanning direction are represented by the distances tc1 and t10c shown in FIG. 5, and the amount of convergent-point shift in the sub-scanning direction at the same angle of view is represented by "tc1+t10c".

The amount of this shift increases as the values $R_i$ and $\Omega$ increase, and the largest amount of the shift is calculated when $\theta$ is at the maximum angle of view.

Most of modern optical scanning devices, especially, high-end optical scanning devices, have a large (wide) scanning area for enhancement of the productivity and have, in accordance with the large scanning area, a large angle of view $\theta$ and a large radius $R_i$ of the inscribed circle, which increases the amount of the convergent-point shift.

For example, if the magnification of the scanning lens in the sub-scanning direction is M, the amount of the convergent-point shift tc1+t10c mentioned above increases by M*M times at the same angle of view mentioned above, which causes misalignment on the surface 13a in the sub-scanning direction.

If the misalignment is asymmetric within the scanning area, the diameter of an imaging spot in the sub-scanning direction at the scanning start edge becomes different from the diameter of an imaging spot at the scanning end edge, which may cause degradation of the formed image, such as an uneven thickness in a horizontal line or an uneven density in a half-tone image.

In the example shown in FIGS. 4 and 5, the coordinates of each point are calculated as follows in the coordinate system $\xi$–$\eta$ with the rotation center of the rotary polygon mirror 6 being coincident with the origin of the coordinate system:

Point $dc(\xi,\eta)=\{R_i^*\sin\beta-\delta^*\cos\beta, R_i^*\cos\beta+\delta^*\sin\beta\}$ Point $cc(\xi,\eta)=\{(R_i^*(\sin 2\beta-\sin\beta^*\cos(\beta-\theta/2))-\delta^*\cos\beta^*\cos(\beta-\theta/2))/\cos(\beta+\theta/2),(R_i^*(\cos 2\beta+\sin\beta^*\sin(\beta-\theta/2))+\delta^*\cos\beta^*\sin(\beta-\theta/2))/\cos(\beta+\theta/2)\}$ Point $ec(\xi,\eta)=\{-R_i^*\sin(\beta-\theta)+2^*R_i^*\sin(\beta-\theta/2)-\delta^*\cos(\beta-\theta), -R_i^*\cos(\beta-\theta)+2^*R_i^*\cos(\beta-\theta/2)+\delta^*\sin(\beta-\theta)\}$ Point $d1(\xi,\eta)=\{R_i^*\sin\beta-\delta^*\cos\beta-\Delta^*\cos 2\beta\tan\Omega, R_i^*\cos\beta+\delta^*\sin\beta+\Delta^*\sin 2\beta\tan\Omega\}$ Point $c1(\xi,\eta)=\{(R_i^*(\sin(2\beta-\Omega)-\sin(\beta-\Omega)^*\cos(\beta-\theta/2-\Omega/2))-\delta^*\cos(\beta-\Omega)^*\cos(\beta-\theta/2-\Omega/2)-\Delta^*\sin\Omega^*\cos(\beta-\theta/2-\Omega/2))/\cos(\beta+\theta/2-\Omega/2),(R_i^*(\cos(2\beta-\Omega)-\sin(\beta-\Omega)^*\sin(\beta-\theta/2-\Omega/2))+\delta^*\cos(\beta-\Omega)^*\sin(\beta-\theta/2-\Omega/2)+\Delta^*\sin\Omega^*\sin(\beta-\theta/2-\Omega/2))/\cos(\beta+\theta/2-\Omega/2)\}$ Point $e1(\xi,\eta)=\{R_i^*(-\sin(\beta-\theta-\Omega)+2\sin(\beta-\theta/2-\Omega/2))-\delta^*\cos(\beta-\theta\Omega)-\Delta^*\cos(\theta+\Omega)^*\tan\Omega, R_i^*(-\cos(\beta-\theta\Omega)-2\cos(\beta-\theta/2-\Omega/2))+\delta^*\sin(\beta-\theta-\Omega)-\Delta^*\sin(\theta+\Omega)^*\tan\Omega\}$ Point $d10(\xi,\eta)=\{R_i^*\sin\beta-\delta^*\cos\beta-\Delta^*\cos 2\beta^*\tan\Omega, R_i^*\cos\beta+\delta^*\sin\beta+\Delta^*\sin 2\beta^*\tan\Omega\}$ Point $c10(\xi,\eta)=\{(R_i^*(\sin(2\beta-\Omega)-\sin(\beta-\Omega)^*\cos(\beta-\theta/2-\Omega/2))-\delta^*\cos(\beta-\Omega)^*\cos(\beta-\theta/2-\Omega/2)-\Delta^*\sin\Omega^*\cos(\beta-\theta/2-\Omega/2))/\cos(\beta+\theta/2-\Omega 2),(R_i^*(\cos(2\beta-\Omega)-\sin(\beta-\Omega)^*\sin(\beta-\theta/2-\Omega/2))+\delta^*\cos(\beta-\Omega)^*\sin(\beta-\theta/2-\Omega/2)+\Delta^*\sin\Omega^*\sin(\beta-\theta/2-\Omega/2))/\cos(\beta+\theta/2-\Omega/2)\}$ Point $e10(\xi,\eta)=\{R_i^*(-\sin(\beta-\theta-\Omega)+2\sin(\beta-\theta/2-\Omega/2))-\delta^*\cos(\beta-\theta-\Omega)-\Delta^*\cos(\theta+\Omega)^*\tan\Omega, R_i^*(-\cos(\beta-\theta\Omega)-2\cos(\beta-\theta/2-\Omega/2))+\delta^*\sin(\beta-\theta-\Omega)-\Delta A^*\sin(\theta+\Omega)^*\tan\Omega\}$ The convergent-point shifts tc1 and t10c in the sub-scanning direction are calculated as follows:

Distance between the point e1 and the point ec $(tc1)=R_i^*(\cos\beta-2^*\cos(\beta+\theta/2)-\cos(\beta-\Omega)+2^*\cos(\beta+\theta/2-\Omega/2))-2^*\delta^*\sin(\theta/2)^*\cos(\beta-\Omega/2)-\Delta^*\sin\Omega^*\tan\Omega$ Distance between the point e10 and the point ec $(t10c)=R_i^*(\cos\beta-2^*\cos(\beta+\theta/2)-\cos(\beta-\Omega)+2^*\cos(\beta+\theta/2-\Omega/2))-2^*\delta^*\sin(\theta/2)^*\cos(\beta-\Omega/2)-\Delta^*\sin\Omega^*\tan\Omega$ Therefore, the amount of the convergent-point shift at the same angle of view is calculated as follows:

$tc1+t10c=|2^*R_i^*(\sin\beta^*\sin\Omega-2^*\sin(\beta+\theta/2)^*\sin(\Omega/2))+2^*\delta^*\cos\beta^*\sin\Omega|$ If the maximum scanning angle of view toward the negative image height of the optical scanning system is $\theta_{max-}$ and the maximum scanning angle of view toward the positive image height of the optical scanning system is $\theta_{max+}$, the difference between the amount of the convergent-point shift at the positive-side maximum angle of view and the amount of the convergent-point shift at the negative-side maximum angle of view is calculated, using the above equation of tc1+ t10c, as $|4*R_i*(\sin \beta*\sin \Omega-\sin(\Omega/2)*(\sin(\beta+\theta_{max-}/2)+\sin(\beta+\theta_{max+}/2)))+4*\delta*\cos \beta*\sin \Omega|$.

In order to balance the asymmetric misalignment of the image shift at the maximum angle on both sides, δ is solved using $|4*R_i*(\sin \beta*\sin \Omega-\sin(\Omega/2)*(\sin(\beta+\theta_{max-}/2)+\sin(\beta+\theta_{max+}/2)))+4*\delta*\cos \beta*\sin \Omega|=0$. And δ is set to the value calculated using Equation 7:

$$\delta = \frac{-\sin\beta\sin\Omega + \sin\frac{\Omega}{2}\left[\sin\left(\beta + \frac{\theta_{max+}}{2}\right) + \sin\left(\beta + \frac{\theta_{max-}}{2}\right)\right]}{\sin\Omega\cos\beta} R_i \quad (7)$$

Here, in a typical optical scanning device, the positive-side maximum angle of view is substantially equal to the negative-side maximum angle of view, Equation 7 is transformed into Equation 8, using $\theta_{max+}=-\theta_{max-}=\theta_{max}$:

$$\delta = \tan\beta\left(\frac{\cos\frac{\theta_{max}}{2}}{\cos\frac{\Omega}{2}} - 1\right)R_i \quad (8)$$

When the values shown in Table 1 are substituted into the parameters of Equation 8, δ is calculated as −0.904 mm.

The radius $R_i$ of the inscribed circle of the rotary polygon mirror and the angle of incidence 2β with the rotary polygon mirror are both positive, and the maximum scanning angle of view $\theta_{max}$ is, in general, much larger than the maximum angle Ω of the chief ray of the rotary-polygon-mirror incoming light; therefore, $\cos(\theta_{max}/2)<\cos(\Omega/2)$.

It means that δ calculated by Equation 8 is negative, and that when δ is negative (smaller than zero), the degree of unbalance of the misalignment is reduced.

However, when δ decreases over the value calculated by Equation 7 or 8, the degree of unbalance of the misalignment inversely increases.

If $\theta_+$ is a positive-side scanning angle of view that is adequate to prevent vignetting of the incoming beam on the rotary polygon mirror and allow the beam to scan the target surface and $\theta_-$ is a negative-side scanning angle of view that is adequate to prevent vignetting of the incoming beam on the rotary polygon mirror and allow the beam to scan the target surface, $\theta_+$ and $\theta_-$ are calculated using the following equations:

$\theta_-=2\pi/N-2\beta+2 \sin-1[\{(\delta*\cos \beta+W)/R_i\}+\sin \beta]*\cos (\pi/N)$ $\theta_+=2\pi/N-2\beta-2 \sin-1[\{(\delta*\cos \beta+W)/R_i\}-\sin \beta]*\cos (\pi/N)$ For effective use of the optical characteristics of the scanning lens, a smaller degree of asymmetry of the scanning angles of view is preferable.

In order to balance an area of scanning angles of view from positive to negative adequately to prevent vignetting of the beam, $|\theta_-|$ is set equal to $|\theta_+|$ and δ is solved by substituting the values shown in Table 1 to the above-described two equations. Then, δ is 1.991 mm, $\theta_-=-33.2$ degrees and $\theta_+=33.2$ degrees are calculated.

When δ is −0.904 mm and the values shown in Table 1 are used, then $\theta_-=-40.3$ degrees and $\theta_+=26.8$ degrees are calculated.

Therefore, to achieve a good balance between prevention of beam vignetting on the rotary polygon mirror and suppression of the degree of unbalance of the misalignment, δ is preferably set to satisfy Equation 9 even in a negative value:

$$\frac{-\sin\beta\sin\Omega + \sin\frac{\Omega}{2}\left[\sin\left(\beta + \frac{\theta_{max+}}{2}\right) + \sin\left(\beta + \frac{\theta_{max-}}{2}\right)\right]}{\sin\Omega\cos\beta} R_i \leq \delta \leq 0 \quad (9)$$

Figure 6:
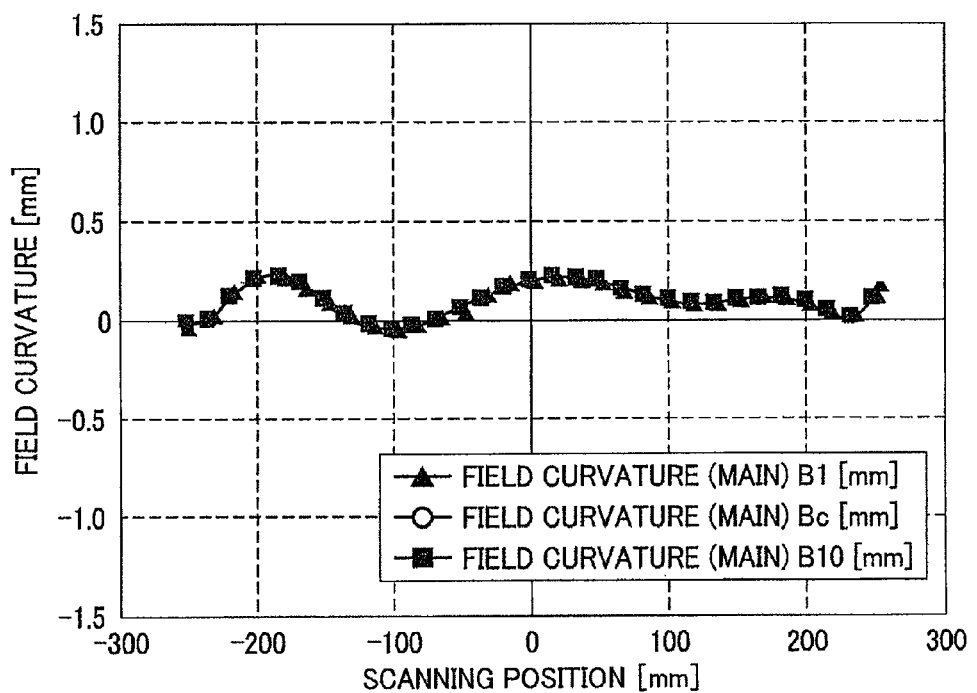
FIG. 6 is a graph that explains a curvature field characteristic in the main-scanning direction of a surface to be scanned by the optical scanning device according to the first embodiment of the present invention.
Figure 7:
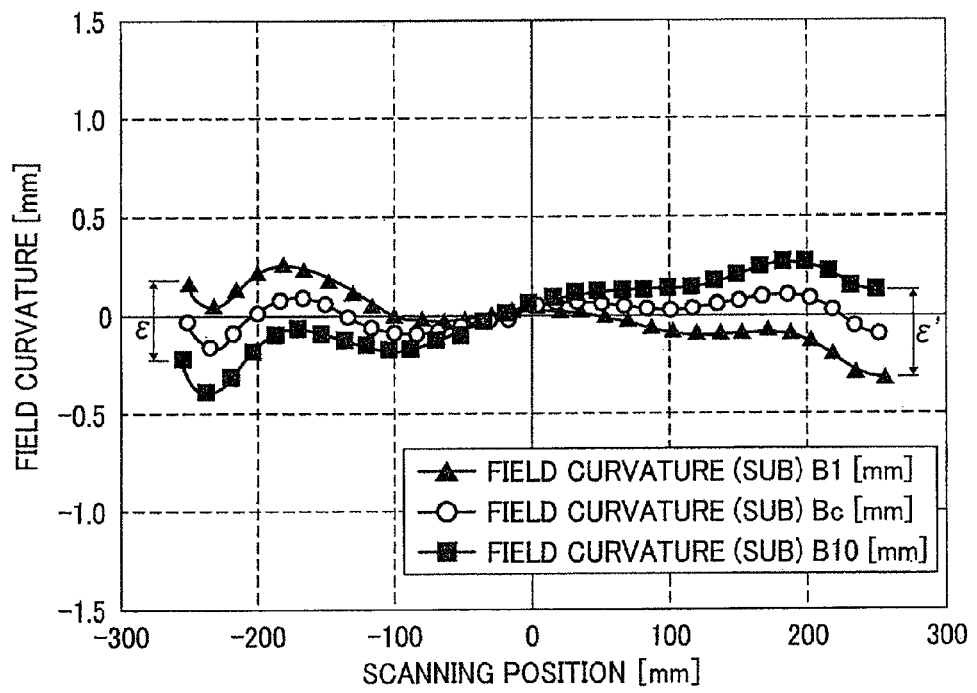
FIG. 7 is a graph that explains a curvature field characteristic in the sub-scanning direction of the surface to be scanned by the optical scanning device according to the first embodiment of the present invention.

FIGS. 6 and 7 are graphs of the field curvature characteristic of the surface to be scanned used in the optical scanning device according to the present embodiment, where $\theta_{max+}=\theta_{max-}=\theta_{max}$ and δ=−0.904 mm. FIG. 6 illustrates the field curvature characteristic of the surface to be scanned in the main-scanning direction; and FIG. 7 illustrates the field curvature characteristic of the surface to be scanned in the sub-scanning direction.

In the optical scanning device according to the present embodiment, the image misalignment in the sub-scanning direction at one edge is equal to the image misalignment at the other edge (ϵ=ϵ') and the misalignment is balanced within the scanning area.

Moreover, if the imaging spot on the surface to be scanned is a spot of a Gaussian beam with 60 μm, the image misalignment becomes less than or equal to the depth of focus.

By using the above-described one-dimensionally arrayed light source 1, the degree of asymmetry of the misalignment between the beams is suppressed more.

Figure 8:
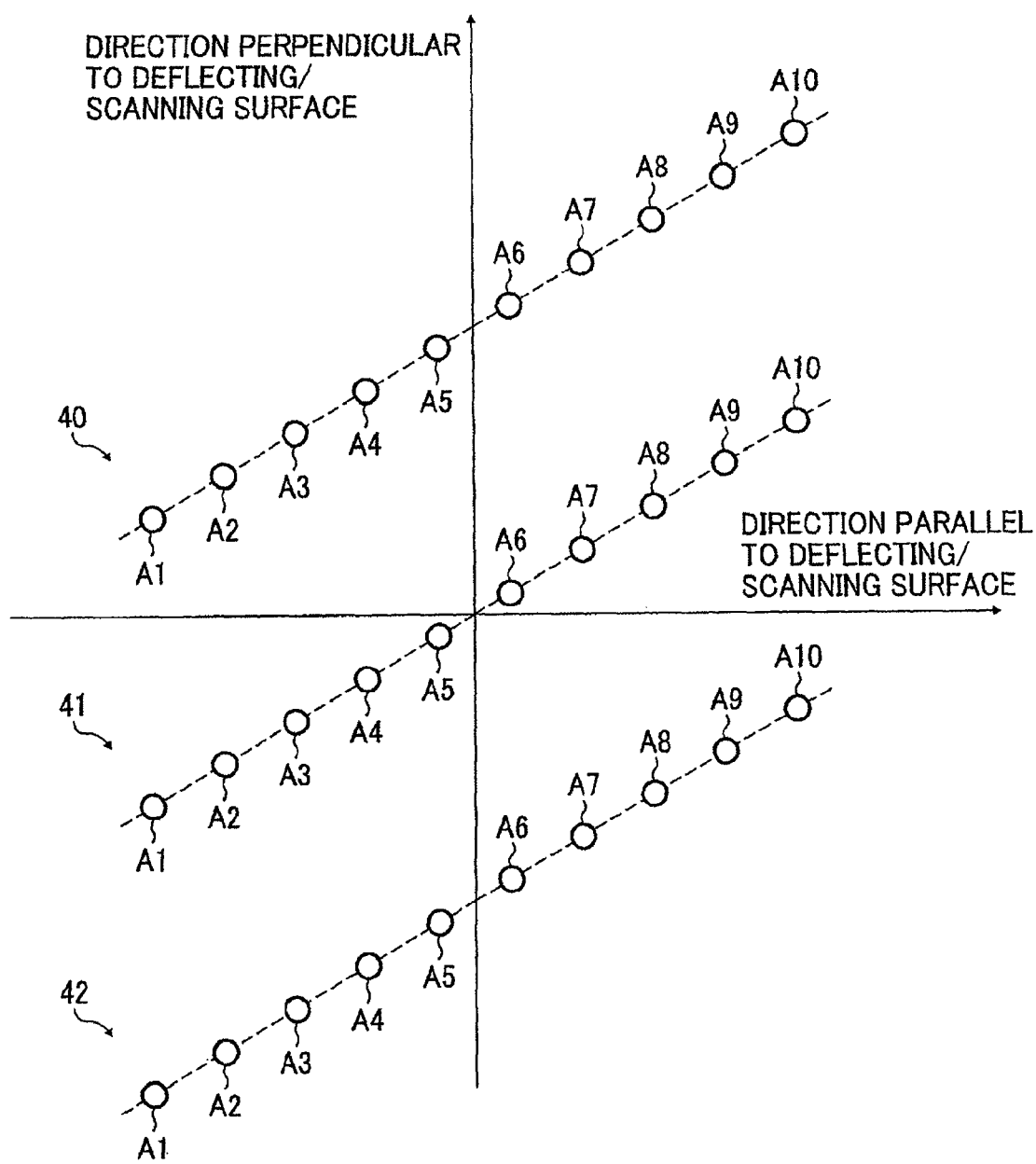
FIG. 8 is a schematic diagram of a configuration of another multi-beam light source used in the optical scanning device according to the first embodiment of the present invention.

In the above-descried embodiment, instead of the one-dimensionally arrayed light source shown in FIG. 2, some other light sources can be used as the light source 1, such as a light source having the arrangement shown in FIG. 8.

The light source shown in FIG. 8 is a surface-emitting laser diode array (called "two-dimensional surface-emitting laser diode array"). The light source includes several rows of light sources 40 to 42, each having ten luminous points A1 to A10 arranged at equal intervals in a one-dimensional manner. Each row of the light sources makes a certain angle with the horizontal axis direction, and the rows are spaced with each other at equal intervals in the vertical axis direction.

Such a two-dimensional array can operate in the same manner and the degree of asymmetry of misalignment between the beams of light is suppressed more.

Although, in the above description, the group of scanning lenses 7 includes five lenses, the number of the scanning lenses can be more than or less than five.

The optical scanning device according to the present embodiment can suppress, on the surface to be scanned with a plurality of beams, the degree of asymmetry of misalignment in the direction perpendicular to the deflecting/scanning direction between the plurality of beams at the scanning-start-side edge and those at the scanning-end-side edge.

Moreover, the image misalignment is suppressed in the sub-scanning direction within the effective scanning area.

Furthermore, by reducing the asymmetry of the image misalignment in the sub-scanning direction at the both scanning edges, the entire scanning area gets balanced.

Second Embodiment

If the optical scanning device according to the first embodiment is used in an image forming apparatus, such as a printer, a copier, a facsimile machine, or an MFP, the optical scanning device suppresses the degree of asymmetry of image misalignment in the direction perpendicular to the deflecting/scanning direction between the plurality of beams at the scanning-start-side edge and those at the scanning-end-side edge, which enhances the quality of an image formed by the image forming apparatus.

An image forming apparatus according to a second embodiment includes the optical scanning device according to the first embodiment.

Figure 9:
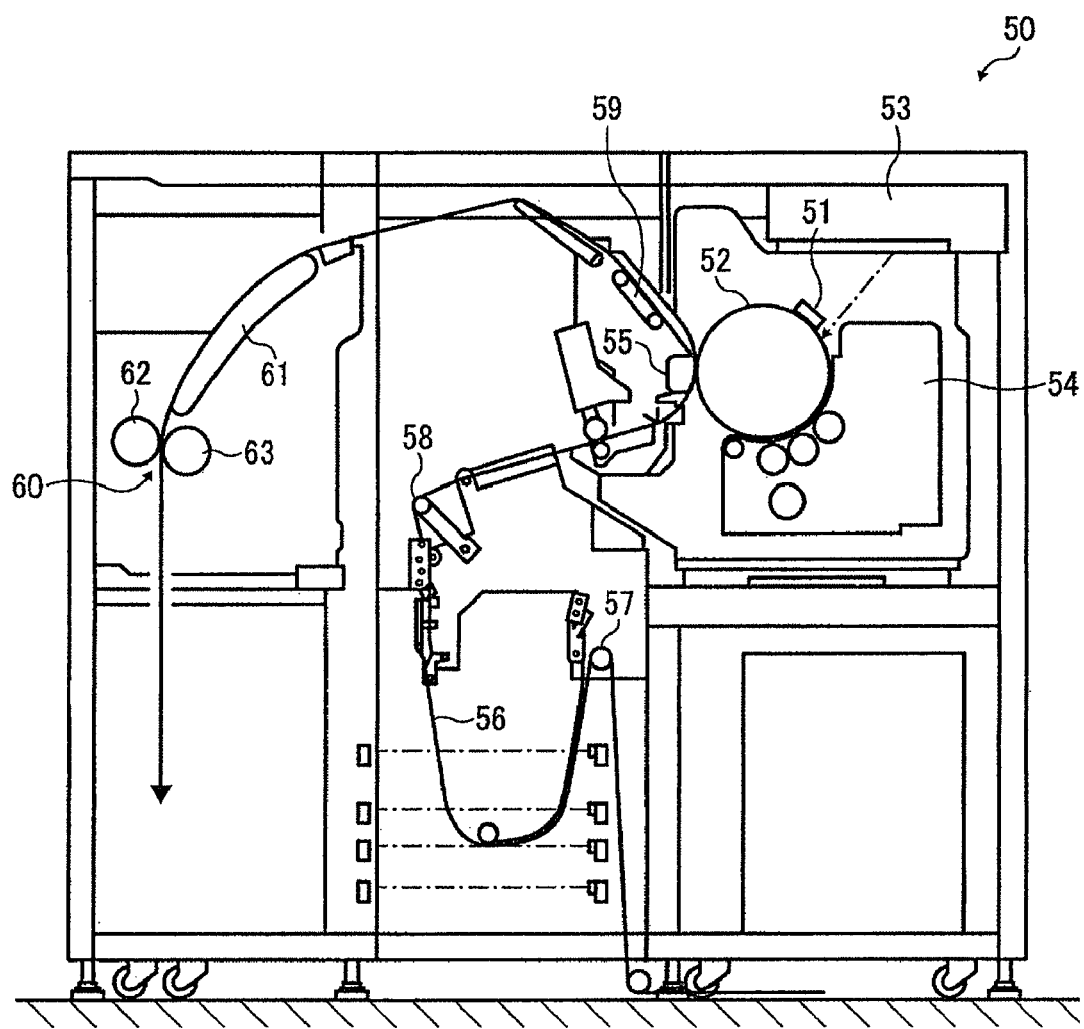
FIG. 9 is a schematic diagram of a configuration of an image forming apparatus according to a second embodiment of the present invention.
Figure 10:
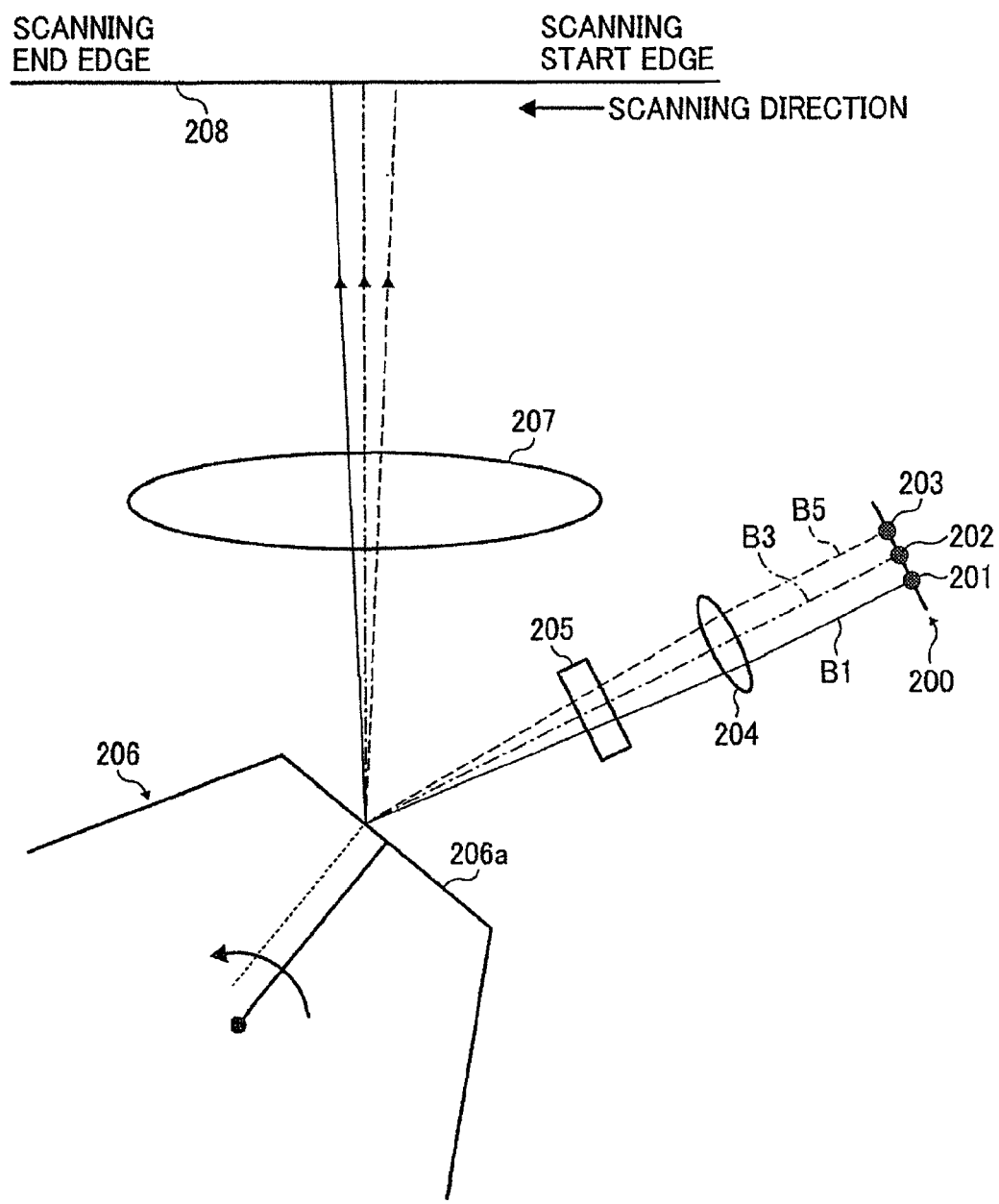
FIG. 10 is a schematic diagram of the configuration of a conventional optical scanning device that uses a plurality of beams of light in a conventional manner.
Figure 11:
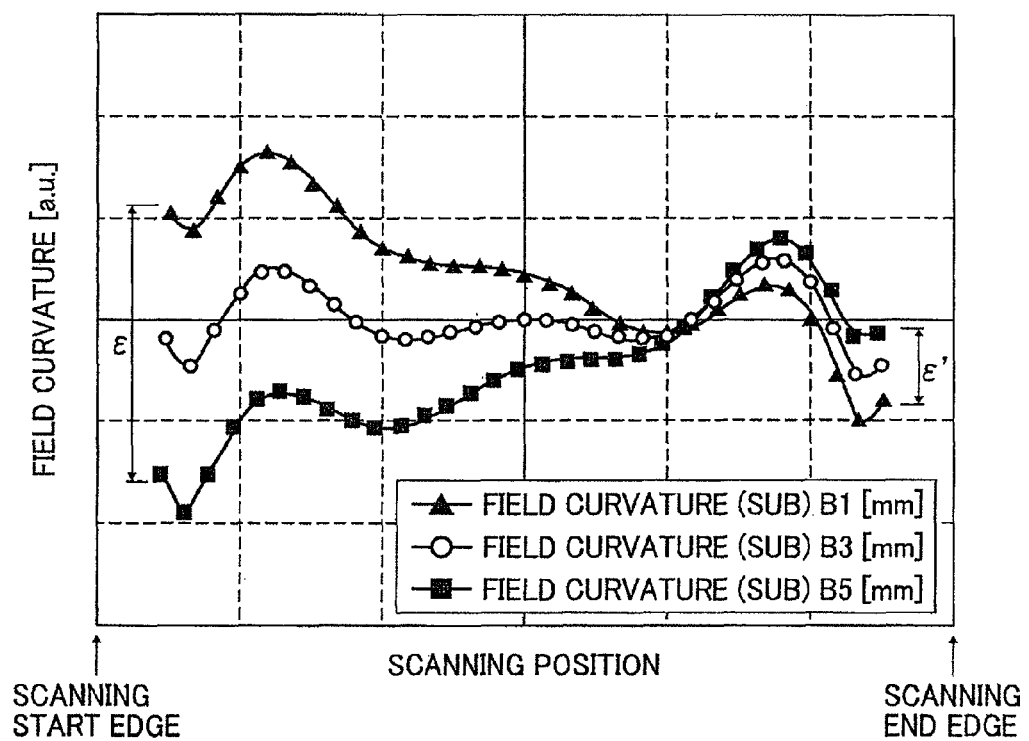
FIG. 11 is a graph that explains asymmetric misalignment in the sub-scanning direction in the scanning area in the conventional optical scanning device.

FIG. 9 is a schematic diagram of the configuration of an image forming apparatus that includes the optical scanning device according to the first embodiment.

An image forming apparatus 50 shown in FIG. 9 is, for example, a printer, a copier, or a facsimile machine. In the image forming apparatus 50, an optical scanning device irradiates the surface of a photosensitive element 52 charged by a charging device 51 with laser light emitted thereby and a latent image is formed on the surface of the photosensitive element 52. The optical scanning device 53 has the same configuration as the optical scanning device according to the first embodiment has.

The laser light irradiates the surface of the photosensitive element 52 in such a manner that the laser light makes a certain angle of incidence with the normal of the photosensitive element 52.

The photosensitive element 52 with the latent image that is formed in the above-described manner rotates in the clockwise direction, and the latent image is developed into a toner image by a developing device 54 with toners.

A web (sheet of paper) 56 is conveyed from a sheet tray or the like by conveying devices 57 to 59. The web 56 makes a press-contact with the photosensitive element 52 by operation of a transferring device 55 and, in turn, the toner image is transferred from the photosensitive element 52 onto the web 56. After that, the web 56 is conveyed to a fixing device 60.

The fixing device 60 includes a pre-heater 61, a heat roller 62, a backup roller 63, etc. The fixing device 60 heats and presses the web 56 using these rollers, thereby fixing the toner image onto the web 56. The process of forming the image on the web 56 is then completed.

As it is clear from the above description, the charging device 51 corresponds to a charging unit that charges the surface of the photosensitive element 52; the photosensitive element 52 corresponds to a photosensitive element; and the optical scanning device 53 corresponds to an optical scanning unit that forms a latent image by irradiating the surface of the photosensitive element 52 that has been charged by the charging device 51.

The developing device 54 corresponds to a developing unit that forms a toner image by developing the latent image on the photosensitive element 52 with toners; the transferring device 55 corresponds to a transferring unit that transfers the toner image from the photosensitive element 52 onto the web (recording medium) 56; and the fixing device 60 corresponds to a fixing unit that fixes the toner image onto the web 56.

Even after the toner image is transferred from the photosensitive element 52 onto the web 56, the photosensitive element 52 keeps rotating and the next image forming process (charging, exposing, developing, transferring, and fixing) is repeated and another web 56 is fed from the sheet tray or similar. Thus, the image formation is performed repeatedly in the above-described manner.

Because the optical scanning device according to the first embodiment is included in the image forming apparatus 50 according to the second embodiment, the image forming apparatus 50 can suppress the degree of asymmetry of image misalignment in the direction perpendicular to the deflecting/scanning direction between the plurality of beams at the scanning-start-side edge and those at the scanning-end-side edge, which enhances the quality of the formed image. Moreover, an environmentally highly stable and high-quality image forming apparatus will be manufactured.

Figure 12:
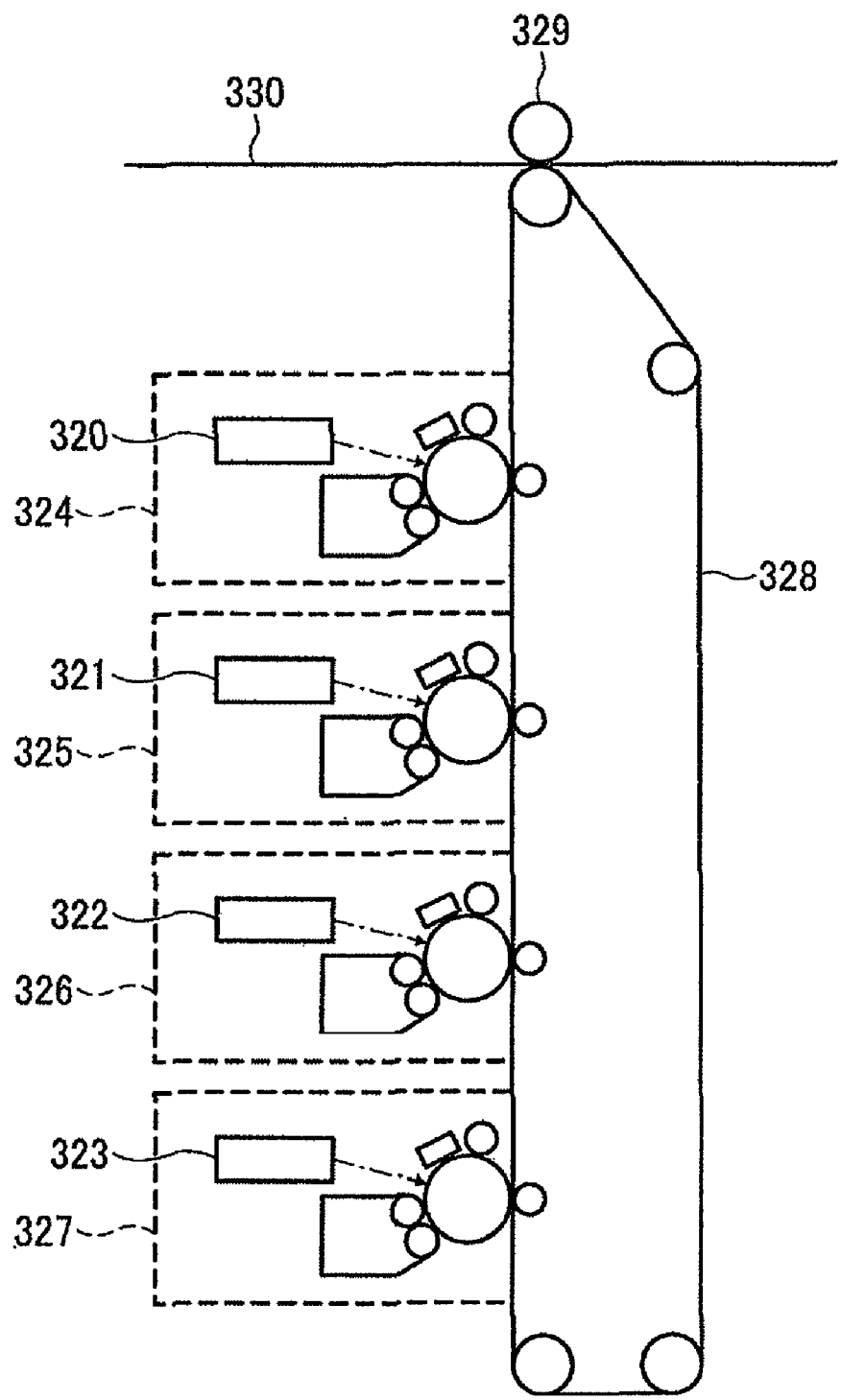
FIG. 12 is a schematic diagram of a configuration of an image forming apparatus that includes optical scanning devices according to a third embodiment of the present invention.

FIG. 12 is a schematic diagram of the configuration of an image forming apparatus that includes four optical scanning devices that are according to the embodiment of the present invention.

The reference numerals 320 to 323 shown in FIG. 12 denote optical scanning devices according to an embodiment of the present invention.

The reference numerals 324 to 327 denote developing units. Each of the developing units 324 to 327 includes a photosensitive element; a charging device that charges the surface of the photosensitive element; an optical scanning device that forms a latent image on the surface of the photosensitive element by irradiating the surface of the photosensitive element that has been charged by the charging device; a developer that forms a toner image by developing the latent image on the photosensitive element with toners (these devices are well known; therefore, no reference numerals are denoted to these devices and the description for these devices will not be made).

The developing units 324 to 327 are arranged in the vertical direction. The developing units 324 to 327 form, for example, a cyan image, a magenta image, a yellow image, and a black image, respectively.

After that, the different-color toner images, each formed on a drum-shaped photosensitive element by the corresponding one of the developing units 324 to 327, are transferred onto a belt-shaped intermediate transfer medium 328 in a superimposed manner, and thus a full-color toner image is formed. The full-color toner image is then transferred by a transferring member 329 onto a recording sheet (image recording sheet) 330 and fixed by a fixing device (not shown, because it is well known) onto the recording sheet 330, and thus the full-color image is formed on the recording sheet 330.

As descried above, it is possible to use the optical scanning device according to an embodiment of the present invention in an image forming apparatus, such as a copier, a facsimile machine, a printer, or an MFP.

TABLE 1

| | |
|---|---|
| Wavelength of light emitted from light source | 660 nm |
| Number of luminous points of light source | 10 |
| Pitch of luminous points | 60 μm |
| Angle between row of luminous points and deflecting/scanning surface | 2.93° |
| Focal length of coupling lens 2 ($f_{COL}$) | 15 mm |
| Focal length of lens 3 ($f_{L1}$) | 100 mm |
| Focal length of lens 4 ($f_{L2}$) | 400 mm |
| Focal length of cylinder lens 5 ($f_{CYL}$) | 180 mm |
| Full width of rotary-polygon-mirror incoming beams in main-scanning direction (2W) | 4.3 mm |
| Number of surfaces of rotary polygon mirror (N) | 8 |
| Radius of inscribed circle of rotary polygon mirror ($R_i$) | 45 mm |
| Angle of incidence into rotary polygon mirror (2β) | 60° |
| Maximum angle of rotary-polygon-mirror incoming beam (Ω) | ±0.258° |
| Distance between deflecting surface of rotary polygon mirror and chief-ray intersection (Δ) | 0 mm |
| Amount of shift away from scanning-lens center (δ) | −0.904 mm |
| Focal length of scanning lends (main-scanning direction) | 480 mm |
| Magnification of scanning lens (sub-scanning direction) | ×2.3 |
| Effective scanning width | 20 inches |
| Maximum scanning angle of view ($\theta_{max}$) | ±30.32° |

TABLE 2

| Surface number | Radius of curvature in main-scanning direction | Radius of curvature in sub-scanning direction | Inter-surface distance | Index of refraction (@660 nm) | Abbe number vd |
|---|---|---|---|---|---|
| (1) | ∞ | | 20.00 | 1.000 | — |
| (2) | ∞ | | 2.13 | 1.5138 | 64.1 |
| (3) | ∞ | | 119.20 | 1.0000 | — |
| (4) | −441.30 | | 21.00 | 1.6149 | 66.3 |
| (5) | −155.90 | | 10.14 | 1.0000 | — |
| (6) | −156.77 | | 12.00 | 1.7958 | 25.4 |
| (7) | −354.07 | | 12.00 | 1.0000 | — |
| (8) | ∞ | | 35.00 | 1.6349 | 55.4 |
| (9) | −294.72 | −137.57 | 14.00 | 1.0000 | — |
| (10) | ∞ | 206.70 | 10.00 | 1.5138 | 64.1 |
| (11) | ∞ | | 22.33 | 1.0000 | — |
| (12) | 764.46 | −250.91 | 3.00 | 1.5282 | 56.0 |
| (13) | 821.96 | −113.63 | 441.33 | 1.0000 | — |
| (14) | — | | — | — | — |

TABLE 3

| Surface number | Coefficient of additional function |
|---|---|
| (12) | $P_{02} = +4.0825035 \times 10^{-03}$ |
| | $P_{12} = -4.8095300 \times 10^{-06}$ |
| | $P_{40} = -4.3852538 \times 10^{-08}$ |
| | $P_{22} = +4.6809219 \times 10^{-08}$ |
| | $P_{04} = -3.6092939 \times 10^{-06}$ |
| | $P_{32} = -1.2103185 \times 10^{-09}$ |
| | $P_{60} = +6.3370169 \times 10^{-13}$ |
| | $P_{42} = +7.3384834 \times 10^{-12}$ |
| | $P_{24} = +2.1141688 \times 10^{-11}$ |
| | $P_{52} = +3.9876735 \times 10^{-14}$ |
| | $P_{80} = +1.6215980 \times 10^{-17}$ |
| | $P_{62} = -1.8649792 \times 10^{-16}$ |
| (13) | $P_{02} = +6.5542811 \times 10^{-03}$ |
| | $P_{12} = -5.0597152 \times 10^{-06}$ |
| | $P_{40} = -4.2239774 \times 10^{-08}$ |
| | $P_{22} = +8.5707288 \times 10^{-09}$ |
| | $P_{04} = -3.6084257 \times 10^{-06}$ |
| | $P_{32} = -1.2136336 \times 10^{-09}$ |
| | $P_{60} = +7.5733930 \times 10^{-13}$ |
| | $P_{42} = +7.0576788 \times 10^{-12}$ |
| | $P_{24} = +2.1841169 \times 10^{-11}$ |
| | $P_{52} = +3.9595693 \times 10^{-14}$ |
| | $P_{80} = +1.5909625 \times 10^{-17}$ |
| | $P_{62} = -1.8082751 \times 10^{-16}$ |

An optical scanning device and an image forming apparatus according to the present invention suppress image misalignment that may occur when a surface to be scanned is exposed to a plurality of beams of light and thus prevent the formed image from being degraded due the misalignment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source that has a plurality of luminous points;
a first optical system that shapes a plurality of beams of light emitted from the light source;
a rotary polygon mirror
that has deflecting surface and
that deflects the beams of light output from the first optical system by the deflecting surface; and
an optical scanning system that causes the beams of light that are deflected by the rotary polygon mirror to form images on a surface to be scanned,
wherein
after chief rays of the beams of light are output from the first optical system, the chief rays strike the deflecting surface with different angles with respect to the optical axis of the optical scanning system within a deflecting/scanning surface of the rotary polygon mirror,
β is assumed to be half of an angle formed between the optical axis of the first optical system and the optical axis of the optical scanning system within the deflecting/scanning surface,
δ is assumed to be a distance between an intersection dc and an intersection hh,
the distance being when an angle of β is formed between the optical axis of the first optical system and a normal perpendicular to the deflecting surface, and
the normal passing through the rotation axis of the rotary polygon mirror,
where the intersection dc is the intersection of the optical axis of the first optical system and the deflecting surface, and
the intersection hh is the intersection of the deflecting surface and the normal passing through the rotation axis of the rotary polygon miller,
$R_i$ is assumed to be a radius of an inscribed circle of the rotary polygon mirror,
Ω is assumed to be a maximum value of an angle formed between the chief ray of any of the beams of light output from the first optical system and the optical axis of the first optical system,
$\theta_{max-}$ is assumed to be a maximum scanning angle of view of the chief ray in a negative image height toward the optical scanning system with respect to a light flux passing through the axis of the first optical system or a chief ray of virtual light flux,
$\theta_{max+}$ is assumed to be a maximum scanning angle of view of the chief ray in a positive image height toward the optical scanning system with respect to a light flux passing the axis of the first optical system or a chief ray of virtual light flux, and
δ is set to be a value that satisfies Equation 2:

$$\delta = \frac{-\sin\beta\sin\Omega + \sin\frac{\Omega}{2}\left[\sin\left(\beta + \frac{\theta_{max+}}{2}\right) + \sin\left(\beta + \frac{\theta_{max-}}{2}\right)\right]}{\sin\beta\sin\Omega} R_i \quad (1)$$

given that δ is defined positive when the intersection dc is present on the optical-scanning side of the intersection hh, and that an angle of view θ of the rotary polygon mirror is zero degree.

2. The optical scanning device according to claim 1, wherein
the light source is an arrayed light source that has a plurality of luminous points, wherein the luminous points are aligned at equal intervals in a one-dimensional manner, and
a direction in which the luminous points of each row are aligned is such that, when the beam of light emitted from each luminous point strikes the deflecting surface of the rotary polygon mirror, the beam of light makes a certain angle with a direction perpendicular to the deflecting surface of the rotary polygon mirror.

3. The optical scanning device according to claim 2, wherein the light source is an end-surface emitting laser diode array.

4. The optical scanning device according to claim 1 wherein
- the light source is a two-dimensionally arrayed light source that includes a plurality of rows of luminous points, wherein each row has a plurality of luminous points that are aligned at equal intervals in a one-dimensional manner, and
- a direction in which the luminous points of each row are aligned is such that, when the beam of light emitted from each luminous point strikes the deflecting surface of the rotary polygon mirror, the beam of light makes a certain angle with a direction perpendicular to the deflecting surface of the rotary polygon mirror.

5. The optical scanning device according to claim 4, wherein the light source is an end-surface emitting laser diode array.

6. The optical scanning device according to claim 4, wherein the light source is a surface-emitting laser array.

7. An image forming apparatus comprising:
- a photosensitive element;
- a charging unit that charges a surface of the photosensitive element;
- an optical scanning unit that forms a latent image by irradiating the surface of the photosensitive element that has been charged by the charging unit;
- a developing unit that includes a developing member, wherein the developing member forms a toner image by developing the latent image formed on the photosensitive element with toners;
- a transferring unit that transfers the toner image formed on the photosensitive element onto a recording medium; and
- a fixing unit that fixes the toner image onto the recording medium, wherein
- the image forming apparatus further comprises the optical scanning device according to claim 1.

8. An image forming apparatus comprising:
- a photosensitive element;
- a charging unit that charges a surface of the photosensitive element;
- an optical scanning unit that forms a latent image by irradiating the surface of the photosensitive element that has been charged by the charging unit;
- a developing unit that includes a plurality of developing members, wherein each developing member forms a toner image by developing the latent image formed on the photosensitive element with toners;
- a transferring unit that transfers the toner image formed on the photosensitive element onto a recording medium; and
- a fixing unit that fixes the toner image onto the recording medium, wherein
- the image forming apparatus further comprises the optical scanning device according to claim 1.

* * * * *